GEORGE W. McCAMMON & D. H. BURRELL.
Improvement in Dairy-Heaters for Heating Water.
No. 114,836.                                    Patented May 16, 1871.
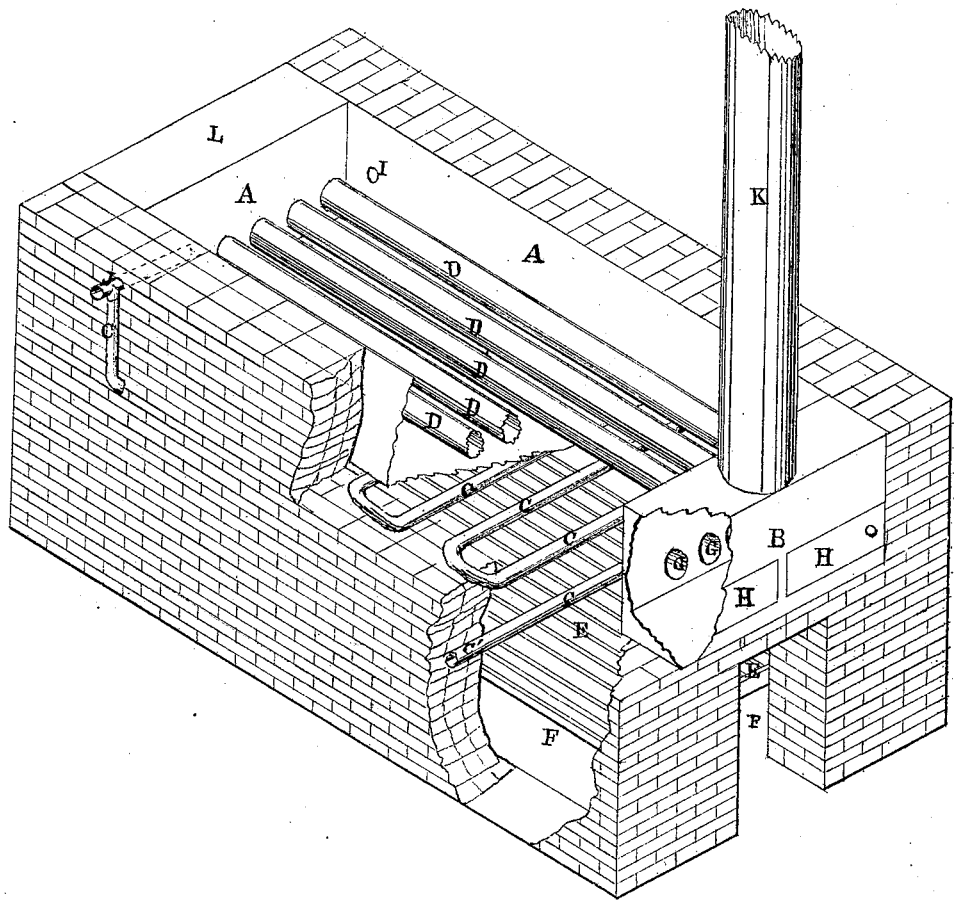

UNITED STATES PATENT OFFICE.

GEORGE W. McCAMMON, OF MANHEIM, AND DAVID H. BURRELL, OF LITTLE FALLS; SAID McCAMMON ASSIGNS HIS RIGHT TO RODNEY S. WHITMAN, OF LITTLE FALLS, NEW YORK.

IMPROVEMENT IN DAIRY-HEATERS FOR HEATING WATER.

Specification forming part of Letters Patent No. 114,836, dated May 16, 1871.

We, GEORGE W. McCAMMON, of Manheim, and DAVID H. BURRELL, of Little Falls, Herkimer county, New York, have invented a new and useful Improvement in Dairy-Heaters for Heating Water for Cheese-Making and other manufacturing purposes.

Our invention is described as follows: A metal vat or tank, A A, of size to hold a sufficient quantity of water, and having a series of metal flues or pipes, D D, running through its entire length near the bottom, is placed over a fire-box, E E, of suitable size and length. The vat is supported in place by metal pipes C C C filled with running water, placed transversely across the fire-box supported by its sides, and connected together so as to supply a continuous supply of water through them from a feed-pipe, C', with which they are connected near the forward end of the fire-box where fuel is supplied. The other or remote end of this feed-pipe C'' is carried out through the wall of the fire-box, turned up, and connected by a T-joint with a pipe, J, leading from the hot-water vat for the waste or overflow pipe. This outflow or waste pipe is placed on an inclination, with its lower end connected with the vat something more than its diameter below the top, so that when the vat is filled the water will no longer flow into it, but will be arrested by the water setting back in the pipe from the vat, and its flow will thus be automatically turned outward either into a reservoir or run to waste, as may be desired.

At another place, as at I, the hot water may be drawn from the vat or tank into the cheese-vats or other place for use.

The pipes upon which the vat rests are arranged on a slight inclination, so that at the back end of the vat they are higher than at the front, by the diameter, or something more.

The heat and smoke pass under the whole length of the vat and back of it, and return to the front through the flues in the vat, and then enter the base of the chimney, which is placed on a metal plate at the front end of the fire-box next the fuel-door. This plate being heated rarefies the air in the base of the chimney, causing it to rise and aid in the draft.

A door is placed in the base of the chimney above the fuel-door to clear out the collections of soot there and in the flues.

Claims.

We claim as our invention, and desire to secure by Letters Patent—

1. The arrangement and combination by which a metal vat or tank of water with flue-pipes passing through it is placed immediately above and upon a series of pipes through which water flows into the vat, by which means the water enters the vat in a partially-heated state.

2. The feed and waste pipe united in one, placed on an inclination, with the manner of heating, as described in the specification, producing the effect, that when the vat is full the flow will be automatically turned outward, thus securing the water in the vat, when full, from being cooled by the inlet of water of a lower temperature.

3. The combination and arrangement of the hot-water vat with a series of smoke-flues through it, the supply-pipes of water placed under the vat and over the fire, the union of the supply and waste pipes arranged as described in the specifications, to regulate automatically the feed and waste of water, and the hot-air chamber at the base of the chimney heating the smoke after it has passed through the flues in the vat, all combined as described in the specifications.

GEO. W. McCAMMON.
DAVID H. BURRELL.

Witnesses:
WATTS T. LOOMIS,
A. LOOMIS.